United States Patent
Tan et al.

(10) Patent No.: US 11,758,277 B2
(45) Date of Patent: Sep. 12, 2023

(54) METHOD FOR DETERMINING SEMI-SYNCHRONOUS EXPOSURE PARAMETERS AND ELECTRONIC DEVICE

(71) Applicant: ARASHI VISION INC., Shenzhen (CN)

(72) Inventors: Kun Tan, Shenzhen (CN); Yibin Guo, Shenzhen (CN)

(73) Assignee: ARASHI VISION INC., Shenzhen (CN)

( * ) Notice: Subject to any disclaimer, the term of this patent is extended or adjusted under 35 U.S.C. 154(b) by 0 days.

(21) Appl. No.: 17/615,530

(22) PCT Filed: May 29, 2020

(86) PCT No.: PCT/CN2020/093293
§ 371 (c)(1),
(2) Date: Nov. 30, 2021

(87) PCT Pub. No.: WO2020/239079
PCT Pub. Date: Dec. 3, 2020

(65) Prior Publication Data
US 2022/0321758 A1     Oct. 6, 2022

(30) Foreign Application Priority Data

May 31, 2019   (CN) .......................... 201910471724.7

(51) Int. Cl.
*H04N 23/73*     (2023.01)
*H04N 23/71*     (2023.01)

(52) U.S. Cl.
CPC ............. *H04N 23/73* (2023.01); *H04N 23/71* (2023.01)

(58) Field of Classification Search
CPC .............. H04N 5/2353; H04N 5/2351; H04N 5/23238; H04N 23/73; H04N 23/71; H04N 23/698
See application file for complete search history.

(56) References Cited

U.S. PATENT DOCUMENTS 11,330,171 B1 *   5/2022   Tanner ................... H04N 5/247
2002/0118971 A1   8/2002   Takahashi
(Continued)

FOREIGN PATENT DOCUMENTS

CN      101895783 A      11/2010
CN      103905731 A       7/2014
(Continued)

*Primary Examiner* — Jason A Flohre
(74) *Attorney, Agent, or Firm* — Cheng-Ju Chiang

(57) ABSTRACT

Disclosed are a method for determining semi-synchronous exposure parameters and an electronic device. The method in the embodiments of the present invention comprises: acquiring first exposure parameters corresponding to each lens; if it is determined that a preset EV limit value is not satisfied according to the first exposure parameters of each lens and adjacent lenses, respectively calculating exposure control parameters of each lens; calculating second exposure parameters corresponding to each lens according to the exposure control parameters of each lens and the first exposure parameters corresponding to each lens; if it is determined that the preset EV limit value is satisfied according to the second exposure parameters of each lens and adjacent lenses, determining the second exposure parameters corresponding to each lens to be semi-synchronized exposure parameters of each lens.

19 Claims, 2 Drawing Sheets

(56) References Cited

U.S. PATENT DOCUMENTS

| | | | |
|---|---|---|---|
| 2016/0234437 A1* | 8/2016 | Kuwada | H04N 5/247 |
| 2017/0095297 A1* | 4/2017 | Richmond | A61B 1/00165 |
| 2017/0118456 A1 | 4/2017 | Lee et al. | |
| 2017/0295309 A1* | 10/2017 | Cabral | H04N 5/23238 |
| 2020/0077033 A1* | 3/2020 | Chan | H04N 5/2353 |
| 2020/0154025 A1* | 5/2020 | Wakatsuki | H04N 5/232 |
| 2020/0396363 A1* | 12/2020 | Wang | H04N 5/2351 |

FOREIGN PATENT DOCUMENTS

| | | |
|---|---|---|
| CN | 105141833 A | 12/2015 |
| CN | 105430285 A | 3/2016 |
| CN | 105979238 A | 9/2016 |
| CN | 106375679 A | 2/2017 |
| CN | 107071291 A | 8/2017 |
| CN | 107205109 A | 9/2017 |
| CN | 107257443 A | 10/2017 |
| CN | 107948542 A | 4/2018 |
| CN | 107968918 A | 4/2018 |
| CN | 108156392 A | 6/2018 |
| CN | 108377345 A | 8/2018 |
| CN | 108737738 A | 11/2018 |
| CN | 110049257 A | 7/2019 |

* cited by examiner

METHOD FOR DETERMINING SEMI-SYNCHRONOUS EXPOSURE PARAMETERS AND ELECTRONIC DEVICE

CROSS REFERENCE TO RELATED APPLICATIONS

The present application is a 35 U.S.C. § 371 National Phase conversion of International (PCT) Patent Application No. PCT/CN2020/093293, filed on May 29, 2020, which claims benefit of a Chinese Patent Application No. 201910471724.7, filed on May 31, 2019, the disclosure of which is incorporated by reference herein. The PCT International Patent Application was filed and published in Chinese.

FIELD OF THE INVENTION

The present invention relates to the field of imaging, and particularly to a method and an electronic device for determining semi-synchronous exposure parameters.

BACKGROUND OF THE INVENTION

In the technical solution for synchronous auto-exposure of existing multi-lens panoramic cameras, the method for synchronous auto-exposure comprises: combining the environmental brightness corresponding to each lens, calculating a set of exposure parameters with central tendency, and determining all lenses using the exposure parameters.

However, in scenes with relatively high light contrast, all lenses use the same exposure parameter, which is not very reasonable. For example, on the side of a window, the exposure parameter obtained by the synchronous auto-exposure method is a centered value, which will cause the lens facing the outside of the window to be over-exploded, and the lens facing the indoors is under-exploded.

Technical Problem

A method and an electronic device for determining semi-synchronous exposure parameters provided in the present invention, can be used for well balancing the image effect and stitching effect for a multi-lens panoramic camera, and allow users to set an EV (Exposure Value) limit value so that the users can control the exposure effect according to the environment and their own needs.

Technical Solution

In a first aspect, the present invention provides a method for determining semi-synchronous exposure parameters, comprising steps of:

acquiring first exposure parameters corresponding to each lens;

if it is determined that a preset EV limit value is not satisfied according to the first exposure parameters of each lens and adjacent lenses, respectively calculating exposure control parameters of each lens;

calculating second exposure parameters corresponding to each lens according to the exposure control parameters of each lens and the first exposure parameters corresponding to each lens; and if it is determined that the preset EV limit value is satisfied according to the second exposure parameters of each lens and adjacent lenses, determining the second exposure parameters corresponding to each lens to be semi-synchronized exposure parameters of each lens.

Optionally, in some embodiments of the present invention, the step of calculating second exposure parameters corresponding to each lens according to the exposure control parameters of each lens and the first exposure parameters corresponding to each lens, comprises:

calculating a second exposure parameter corresponding to a first lens according to the product of the exposure control parameter of the first lens and the first exposure parameter corresponding to the first lens.

Optionally, in some embodiments of the present invention, the step of respectively calculating exposure control parameters of each lens, comprises:

obtaining the exposure control parameter of the first lens according to a pre-acquired control coefficient, a first ratio and a second ratio, and a preset first control threshold and second control threshold, wherein the first ratio is a ratio of a target exposure parameter corresponding to the first lens to a maximum exposure parameter of the adjacent lens, and the second ratio is a ratio of the target exposure parameter corresponding to the first lens to a minimum exposure parameter of the adjacent lens.

Optionally, in some embodiments of the present invention, the control coefficient is a coefficient obtained by multiplying the exposure control parameters of the first lens in different calculation cycles and then extracting a square root.

Optionally, in some embodiments of the present invention, the step of acquiring first exposure parameters corresponding to each lens, further comprises:

acquiring ambient brightness corresponding to each lens module; and obtaining the first exposure parameters corresponding to each lens based on the ambient brightness corresponding to each lens module.

In a second aspect, the present invention provides an electronic device, comprising:

an acquisition unit, used for acquiring first exposure parameters corresponding to each lens; and a processing unit, used for: calculating exposure control parameters of each lens respectively if it is determined that a preset EV limit value is not satisfied according to the first exposure parameters of each lens and adjacent lenses; calculating second exposure parameters corresponding to each lens according to the exposure control parameters of each lens and the first exposure parameters corresponding to each lens; and determining the second exposure parameters corresponding to each lens to be semi-synchronized exposure parameters of each lens if it is determined that the preset EV limit value is satisfied according to the second exposure parameters of each lens and adjacent lenses.

Optionally, in some embodiments of the present invention, the processing unit, is used for: calculating a second exposure parameter corresponding to a first lens according to the product of the exposure control parameter of the first lens and the first exposure parameter corresponding to the first lens.

Optionally, in some embodiments of the present invention, the processing unit, is used for: obtaining the exposure control parameter of the first lens according to a pre-acquired control coefficient, a first ratio and a second ratio, and a preset first control threshold and second control threshold, wherein the first ratio is a ratio of a target exposure parameter corresponding to the first lens to a maximum exposure parameter of the adjacent lens, and the second ratio is a ratio of the target exposure parameter corresponding to the first lens to a minimum exposure parameter of the adjacent lens.

Optionally, in some embodiments of the present invention, the control coefficient is a coefficient obtained by multiplying the exposure control parameters of the first lens in different calculation cycles and then extracting a square root.

Optionally, in some embodiments of the present invention, the processing unit, is used for: acquiring ambient brightness corresponding to each lens module; and obtaining the first exposure parameters corresponding to each lens based on the ambient brightness corresponding to each lens module.

In a third aspect, the present invention provides an electronic device including: a transceiver, a processor, and a memory, wherein the transceiver, the processor, and the memory are connected by a bus;

the memory, is used for storing instructions;

the transceiver, is used for acquiring first exposure parameters corresponding to each lens;

the processor, is used for executing the instructions to perform the steps of the method for determining semi-synchronous exposure parameters as described in any optional manner of the first aspect and the first aspect of the present invention.

In a fourth aspect, the present invention provides a readable storage medium on which one or more computer programs are stored. When the one or more computer programs are executed by a processor, cause the processor to perform the steps of the method for determining semi-synchronous exposure parameters as described in any optional manner of the first aspect and the first aspect of the present invention. The computer-readable storage medium may be a non-transitory computer-readable storage medium.

Advantages

The method disclosed in the present invention comprises, acquiring first exposure parameters corresponding to each lens; if it is determined that a preset EV limit value is not satisfied according to the first exposure parameters of each lens and adjacent lenses, respectively calculating exposure control parameters of each lens; calculating second exposure parameters corresponding to each lens according to the exposure control parameters of each lens and the first exposure parameters corresponding to each lens; and if it is determined that the preset EV limit value is satisfied according to the second exposure parameters of each lens and adjacent lenses, determining the second exposure parameters corresponding to each lens to be semi-synchronized exposure parameters of each lens. The method can be used for well balancing the image effect and splicing effect for a multi-lens panoramic camera, and allowing users to set EV limit values so that the users can control the exposure effect according to the environment and their own needs.

DETAILED DESCRIPTION OF THE INVENTION

In order to make the objects, technical solutions, and advantages of the present invention clearer, the following further describes the present invention in detail with reference to the accompanying drawings and embodiments. It should be understood that the specific embodiments described here are only used to explain the present invention, but not to limit the present invention.

In order to illustrate the technical solutions of the present invention, specific embodiments are described below.

First Embodiment

Figure 1:
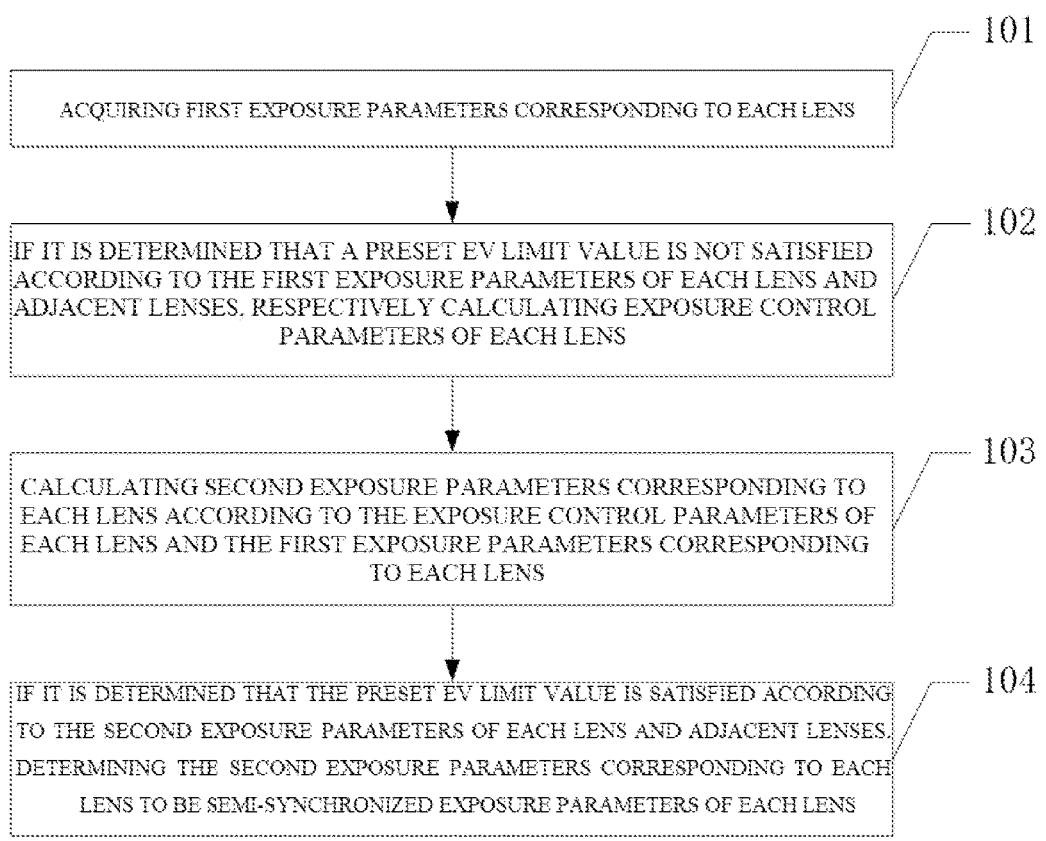
FIG. 1 is a flowchart of a method for determining semi-synchronous exposure parameters in accordance with an embodiment of the present invention.

As shown in FIG. 1, it is a diagram of a method for determining semi-synchronous exposure parameters in accordance with an embodiment of the present invention, which may include steps of 101 to 104.

101, acquiring first exposure parameters corresponding to each lens.

In embodiment of the present invention, the step of acquiring first exposure parameters corresponding to each lens, comprises: acquiring ambient brightness corresponding to each lens module; and obtaining the first exposure parameters corresponding to each lens based on the ambient brightness corresponding to each lens module.

It should be noted that each lens module of the electronic device independently calculates its corresponding environmental brightness, and gives a set of optimal exposure parameters. For each lens module, the exposure effect obtained by using the exposure parameters calculated by itself is the best, while the image effect after stitching needs to be considered. If the exposure difference between adjacent lenses is too high, the stitched image will create a visible seam.

Exemplarily, Ep is the statistical exposure parameters of all lenses, represented by Ep0, Ep1, . . . Epn. There are n lenses, n>=3. Ep0 is the exposure parameter of the current lens, Ep1 and Ep2 are the exposure parameters of the two adjacent lenses of Ep0.

Take a maximum value of Ep1 and Ep2 as Emax, and a minimum value as Emin, as shown below:

$$Emax=max(Ep1, Ep2) \quad Emin=min(Ep1, Ep2)$$

102, if it is determined that a preset EV limit value is not satisfied according to the first exposure parameters of each lens and adjacent lenses, respectively calculating exposure control parameters of each lens.

Where the step of respectively calculating exposure control parameters of each lens, may comprise: obtaining the exposure control parameter of the first lens according to a pre-acquired control coefficient, a first ratio and a second ratio, and a preset first control threshold and second control threshold, wherein the first ratio is a ratio of a target exposure parameter corresponding to the first lens to a maximum exposure parameter of the adjacent lens, and the second ratio is a ratio of the target exposure parameter corresponding to the first lens to a minimum exposure parameter of the adjacent lens; where the control coefficient is a coefficient obtained by multiplying the exposure control parameters of the first lens in different calculation cycles and then extracting a square root.

It can be understood that, the step may comprise: determining one main lens to collect the exposure parameters of all lenses, and then distributing the collected multiple sets of exposure parameters to other lenses; thereby each lens gets the exposure parameters corresponding to all other lenses.

Determining whether the current exposure parameter meets the EV limit value set by the user according to the exposure parameters of each lens and the adjacent lenses; if not, calculating an exposure control parameter, and then calculating a new set of exposure parameters as output according to the exposure control parameters.

Continue that: collecting the exposure parameters of all lenses through the main lens, and then distributing them to other lenses, and then determining whether the exposure parameters between each lens and adjacent lenses meet the EV limit set by the user; until the exposure parameters between all lenses and adjacent lenses meet the EV limit set by the user, and then entering a stable state.

Exemplarily, Ec is a statistical control parameter of all lenses, and similarly, represented by Ec0, Ec1 . . . Ecn. Ec0 is the control parameter of the current lens, Ec1 and Ec2 are the control parameters of the two adjacent lenses of Ec0. Ec0t−1 is the control parameter calculated in the previous calculation cycle of the current lens, and Ec0t is the control parameter calculated in the current calculation cycle of the current lens. Es represents the target exposure parameter required by the current lens.

$$Es=Ep0*Ec0t-1$$

Rd and Ru respectively represent a ratio of the target exposure parameter to the maximum exposure parameter of the adjacent lens and a ratio of the target exposure parameter to the minimum exposure parameter: Rd=Es÷Emax Ru=Es÷Emin multiplying the exposure control parameters and then extracting a square root to obtain the control coefficient Fe:

$$Fe = \sqrt[n]{\prod_{i=0}^{n} Eci}$$

Td and Tu are preset control thresholds.
The control parameters of the current lens are obtained by the following formula:

$$Ec0_t = \begin{cases} \sqrt{\left(\frac{Emax}{Emin}\right)} \div Ru \div Fe & Ru > Tu, Rd < Td \\ Td \div Rd \div Fe & Ru < Tu, Rd < Td \\ Tu \div Ru \div Fe & Ru > Tu, Rd > Td \\ 1 \div Fe & Ru < Tu, Rd > Td \end{cases}$$

103, calculating second exposure parameters corresponding to each lens according to the exposure control parameters of each lens and the first exposure parameters corresponding to each lens.

The step of calculating second exposure parameters corresponding to each lens according to the exposure control parameters of each lens and the first exposure parameters corresponding to each lens, comprises: calculating a second exposure parameter corresponding to a first lens according to the product of the exposure control parameter of the first lens and the first exposure parameter corresponding to the first lens.

Exemplarily, Epd represents the exposure parameter of the current lens calculated by an automatic exposure control system, which is an independent exposure parameter obtained without reference to other lens data. The semi-synchronous exposure parameters of the current lens are calculated by the following formula: Ep0=Epd*Ec0.

104, if it is determined that the preset EV limit value is satisfied according to the second exposure parameters of each lens and adjacent lenses, determining the second exposure parameters corresponding to each lens to be semi-synchronized exposure parameters of each lens.

It should be noted that the preset EV limit value can be an empirical value, which can be flexibly adjusted according to the actual needs of the user.

The second exposure parameters here is the semi-synchronized exposure parameters of each lens. The corresponding semi-synchronous exposure parameters can be used to take pictures.

The method disclosed in the embodiments of the present invention comprises: acquiring first exposure parameters corresponding to each lens; if it is determined that a preset EV limit value is not satisfied according to the first exposure parameters of each lens and adjacent lenses, respectively calculating exposure control parameters of each lens; calculating second exposure parameters corresponding to each lens according to the exposure control parameters of each lens and the first exposure parameters corresponding to each lens; and if it is determined that the preset EV limit value is satisfied according to the second exposure parameters of each lens and adjacent lenses, determining the second exposure parameters corresponding to each lens to be semi-synchronized exposure parameters of each lens. The method can be used for well balancing the image effect and splicing effect for a multi-lens panoramic camera, and allowing users to set EV limit values so that the users can control the exposure effect according to the environment and their own needs. For multi-lens with semi-synchronized automatic exposure, calculates exposure control parameters, and controls multi-lens with fast exposure and stable converge, and meet the set EV limit. That is, uses different exposure parameters of each lens for different environments, and then controls the exposure of each adjacent lens according to an EV limit value set by the user, so that the exposure difference of adjacent lenses will not be too high.

Second Embodiment

Figure 2:
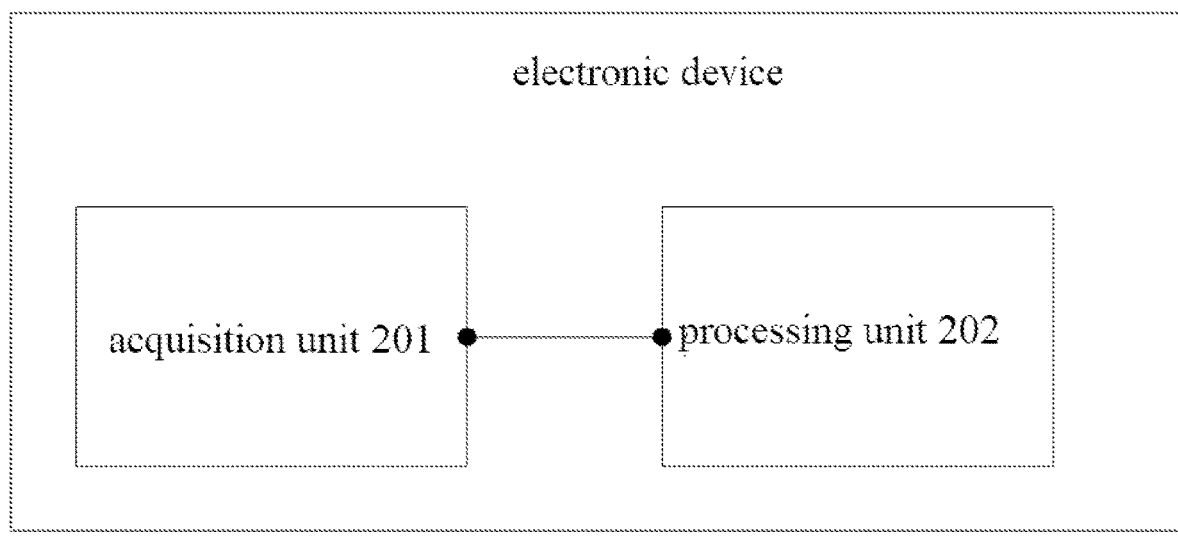
FIG. 2 is a schematic diagram of an electronic device in accordance with an embodiment of the present invention.

As shown in FIG. 2, it is a schematic diagram of an electronic device in an embodiment of the present invention, which may include:

an acquisition unit 201, used for acquiring first exposure parameters corresponding to each lens; and a processing unit 202, used for: calculating exposure control parameters of each lens respectively if it is determined that a preset EV limit value is not satisfied according to the first exposure parameters of each lens and adjacent lenses; calculating second exposure parameters corresponding to each lens according to the exposure control parameters of each lens and the first exposure parameters corresponding to each lens; and determining the second exposure parameters corresponding to each lens to be semi-synchronized exposure parameters of each lens if it is determined that the preset EV limit value is satisfied according to the second exposure parameters of each lens and adjacent lenses.

Optionally, in some embodiments of the present invention, the processing unit 202, is used for: calculating a second exposure parameter corresponding to a first lens according to the product of the exposure control parameter of the first lens and the first exposure parameter corresponding to the first lens.

Optionally, in some embodiments of the present invention, the processing unit 202, is used for: obtaining the exposure control parameter of the first lens according to a pre-acquired control coefficient, a first ratio and a second ratio, and a preset first control threshold and second control threshold, wherein the first ratio is a ratio of a target exposure parameter corresponding to the first lens to a maximum exposure parameter of the adjacent lens, and the second ratio is a ratio of the target exposure parameter corresponding to the first lens to a minimum exposure parameter of the adjacent lens.

Optionally, in some embodiments of the present invention, the control coefficient is a coefficient obtained by multiplying the exposure control parameters of the first lens in different calculation cycles and then extracting a square root.

Optionally, in some embodiments of the present invention, the processing unit 202, is used for: acquiring ambient brightness corresponding to each lens module; and obtaining the first exposure parameters corresponding to each lens based on the ambient brightness corresponding to each lens module.

Third Embodiment

Figure 3:
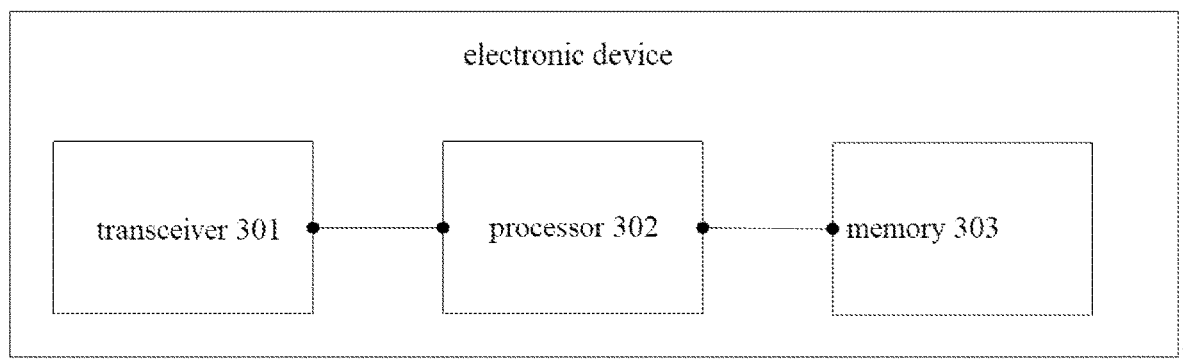
FIG. 3 is a schematic diagram of the electronic device in accordance with another embodiment of the present invention.

As shown in FIG. 3, it is a schematic diagram of an electronic device in another embodiment of the present invention, which may include:

a transceiver 301, a processor 302, and a memory 303, wherein the transceiver 301, the processor 302, and the memory 303 are connected by a bus;

the memory 303, is used for storing instructions;

the transceiver 301, is used for acquiring first exposure parameters corresponding to each lens;

the processor 302, is used for executing the instructions to perform the steps of the method for determining semi-synchronous exposure parameters as described in any optional manner of the first aspect and the first aspect of the present invention.

Optionally, in some embodiments of the present invention, the processor 302, is used for: calculating a second exposure parameter corresponding to a first lens according to the product of the exposure control parameter of the first lens and the first exposure parameter corresponding to the first lens.

Optionally, in some embodiments of the present invention, the processor 302, is used for: obtaining the exposure control parameter of the first lens according to a pre-acquired control coefficient, a first ratio and a second ratio, and a preset first control threshold and second control threshold, wherein the first ratio is a ratio of a target exposure parameter corresponding to the first lens to a maximum exposure parameter of the adjacent lens, and the second ratio is a ratio of the target exposure parameter corresponding to the first lens to a minimum exposure parameter of the adjacent lens.

Optionally, in some embodiments of the present invention, the control coefficient is a coefficient obtained by multiplying the exposure control parameters of the first lens in different calculation cycles and then extracting a square root.

the processor 302 is used for: acquiring ambient brightness corresponding to each lens module; and obtaining the first exposure parameters corresponding to each lens based on the ambient brightness corresponding to each lens module.

In all the above embodiments, it may be implemented in whole or in part by software, hardware, firmware, or any combination thereof. When implemented by software, it can be implemented in the form of a computer program(s) in whole or in part.

The computer program(s) includes one or more computer instructions. When the computer program instructions are loaded and executed on the computer, the processes or functions described in the embodiments of the present invention are performed in whole or in part. The computer may be a general-purpose computer, a special-purpose computer, a computer network, or other programmable devices. The computer instructions may be stored in a computer-readable storage medium or transmitted from one computer-readable storage medium to another computer-readable storage medium. For example, the computer instructions may be transmitted from a website, computer, server, or data center to another website site, computer, server, or data center via wired (such as coaxial cable, optical fiber, digital subscriber line (DSL)) or wireless (such as infrared, wireless, microwave, etc.). The computer-readable storage medium may be any available medium of a computer, or a data storage device such as a server or a data center which are integrated with one or more available media. The available media may be a magnetic medium (for example, a floppy disk, a hard disk, a magnetic tape), an optical medium (for example, a DVD), or a semiconductor medium (for example, a solid state disk (SSD)).

Those skilled in the art can clearly understand that, for the convenience and conciseness of the description, the specific working process of the system, device and unit described above can refer to the corresponding process of the method in the above embodiments, which will not be repeated here.

In the several embodiments provided in the present invention, it should be understood that, the disclosed system, device, and method may be implemented in other ways. For example, the device described in the above embodiments is only illustrative. For example, the division of the units is only a logical function division, and there may be other divisions in actual implementation, for example, multiple units or components can be combined or can be integrated into another system, or some features can be ignored or not implemented. In addition, the mutual coupling or direct coupling or communication connection may be indirect or connected through some interfaces, devices, or units, and may be in electrical, mechanical, or in other forms.

The units described as independent components may or may not be physically separated, and the components defined as units may or may not be physical units, that is, they may be set in one place, or they may be distributed to multiple networks. Some or all of the units may be selected according to actual needs to achieve the objects of the technical solutions of the embodiments.

In addition, the functional units in the various embodiments of the present invention may be integrated into one processing unit, or each unit may exist alone physically, or two or more units may be integrated into one unit. The above-mentioned integrated unit can be realized in the form of hardware or software functional unit.

If the integrated unit is implemented in the form of a software functional unit, and sold or used as an independent product, it can be stored in a computer readable storage medium. Based on this understanding, the technical solutions of the present invention, essentially, or that different from the prior art, or all or part of the technical solution, can be embodied in the form of a software product. The computer software product is stored in a storage medium, comprises several instructions to make a computer device (which can be a personal computer, a server, or a network device, etc.) execute all or part of the steps of the method described in each embodiment of the present invention. The aforementioned storage media includes: U disk, mobile hard disk, Read-Only Memory (ROM), Random Access Memory (RAM), magnetic disks or optical disks or other media that can store program codes.

As mentioned above, the above embodiments are only used to illustrate the technical solutions of the present invention, not to limit the present invention; although the present invention has been described in detail with reference to the foregoing embodiments, those of ordinary skill in the art should understand that: the technical solutions disclosed in the foregoing embodiments may be modified, or some of the technical features may be equivalently replaced; these modifications or replacements do not cause the essence of the corresponding technical solutions to deviate from the spirit and scope of the technical solutions of the embodiments of the present invention.

What is claimed is:

1. A method for determining semi-synchronous exposure parameters, comprising steps of:
acquiring first exposure parameters corresponding to each lens;
if it is determined that a preset EV (Exposure Value) limit value is not satisfied according to the first exposure parameters of each lens and adjacent lenses, respectively calculating exposure control parameters of each lens;
calculating second exposure parameters corresponding to each lens according to the exposure control parameters of each lens and the first exposure parameters corresponding to each lens; and
if it is determined that the preset EV limit value is satisfied according to the second exposure parameters of each lens and adjacent lenses, determining the second exposure parameters corresponding to each lens to be semi-synchronized exposure parameters of each lens;
wherein the step of respectively calculating exposure control parameters of each lens, comprises:
obtaining the exposure control parameter of a first lens according to a pre-acquired control coefficient, a first ratio and a second ratio, and a preset first control threshold and second control threshold, wherein the first ratio is a ratio of a target exposure parameter corresponding to the first lens to a maximum exposure parameter of the adjacent lens, and the second ratio is a ratio of the target exposure parameter corresponding to the first lens to a minimum exposure parameter of the adjacent lens.

2. The method of claim 1, wherein the step of calculating second exposure parameters corresponding to each lens according to the exposure control parameters of each lens and the first exposure parameters corresponding to each lens, comprises:
calculating a second exposure parameter corresponding to a first lens according to the product of the exposure control parameter of the first lens and the first exposure parameter corresponding to the first lens.

3. The method of claim 1, wherein the step of acquiring first exposure parameters corresponding to each lens, further comprises:
acquiring ambient brightness corresponding to each lens module; and
obtaining the first exposure parameters corresponding to each lens based on the ambient brightness corresponding to each lens module.

4. The method of claim 1, wherein the control coefficient is obtained by multiplying the exposure control parameters of the first lens in different calculation cycles and then extracting a square root.

5. The method of claim 4, wherein the target exposure parameter is a product of the first exposure parameter corresponding to the first lens and the exposure control parameter calculated in a previous calculation cycle of the first lens, and the calculation formula of the target exposure parameter is: Es=Ep0*Ec0t−1;
where Es represents the target exposure parameter corresponding to the first lens, Ep0 represents the first exposure parameter corresponding to the first lens, and Ec0t−1 represents the exposure control parameter calculated in the previous calculation cycle of the first lens.

6. The method of claim 5, wherein calculate the exposure control parameters of each lens according to the following formula:

$$Ec0_t = \begin{cases} \sqrt{\left(\frac{E\max}{E\min}\right)} \div Ru \div Fe & Ru > Tu, Rd < Td \\ Td \div Rd \div Fe & Ru < Tu, Rd < Td \\ Tu \div Ru \div Fe & Ru > Tu, Rd > Td \\ 1 \div Fe & Ru < Tu, Rd > Td \end{cases}$$

where Ec0t represents the exposure control parameter of each lens, Emax represents the maximum exposure parameter of the adjacent lens of the first lens, Emin represents the minimum exposure parameter of the adjacent lens of the first lens, Td is the preset first control threshold, Tu is the preset second control threshold, Rd is the first ratio, Ru is the second ratio, and Fe is the control coefficient.

7. The method of claim 6, wherein the step of calculating second exposure parameters corresponding to each lens according to the exposure control parameters of each lens and the first exposure parameters corresponding to each lens, a calculation formula of the second exposure parameter is: Ep=Ep0*Ec0t;
where Ep represents the second exposure parameter.

8. An electronic device, comprising:
a memory, used for storing instructions;
a transceiver, used for acquiring first exposure parameters corresponding to each lens; and
a processor;
wherein the transceiver, the processor, and the memory are connected by a bus; the processor, is used to execute the instructions to perform a method for determining semi-synchronous exposure parameters, comprising steps of:
acquiring first exposure parameters corresponding to each lens;
if it is determined that a preset EV (Exposure Value) limit value is not satisfied according to the first exposure parameters of each lens and adjacent lenses, respectively calculating exposure control parameters of each lens;

calculating second exposure parameters corresponding to each lens according to the exposure control parameters of each lens and the first exposure parameters corresponding to each lens; and if it is determined that the preset EV limit value is satisfied according to the second exposure parameters of each lens and adjacent lenses, determining the second exposure parameters corresponding to each lens to be semi-synchronized exposure parameters of each lens;

where the step of respectively calculating exposure control parameters of each lens, comprises:

obtaining the exposure control parameter of a first lens according to a pre-acquired control coefficient, a first ratio and a second ratio, and a preset first control threshold and second control threshold, wherein the first ratio is a ratio of a target exposure parameter corresponding to the first lens to a maximum exposure parameter of the adjacent lens, and the second ratio is a ratio of the target exposure parameter corresponding to the first lens to a minimum exposure parameter of the adjacent lens.

9. The electronic device of claim 8, wherein the step of calculating second exposure parameters corresponding to each lens according to the exposure control parameters of each lens and the first exposure parameters corresponding to each lens, comprises:

calculating a second exposure parameter corresponding to a first lens according to the product of the exposure control parameter of the first lens and the first exposure parameter corresponding to the first lens;

the control coefficient is obtained by multiplying the exposure control parameters of the first lens in different calculation cycles and then extracting a square root.

10. The electronic device of claim 9, wherein the target exposure parameter is a product of the first exposure parameter corresponding to the first lens and the exposure control parameter calculated in a previous calculation cycle of the first lens, and the calculation formula of the target exposure parameter is: $Es=Ep0*Ec0t-1$;

where Es represents the target exposure parameter corresponding to the first lens, Ep0 represents the first exposure parameter corresponding to the first lens, and Ec0t−1 represents the exposure control parameter calculated in the previous calculation cycle of the first lens.

11. The electronic device of claim 10, wherein calculate the exposure control parameters of each lens according to the following formula:

$$Ec0_t = \begin{cases} \sqrt{\left(\frac{Emax}{Emin}\right)} \div Ru \div Fe & Ru > Tu, Rd < Td \\ Td \div Rd \div Fe & Ru < Tu, Rd < Td \\ Tu \div Ru \div Fe & Ru > Tu, Rd > Td \\ 1 \div Fe & Ru < Tu, Rd > Td \end{cases}$$

where Ec0t represents the exposure control parameter of each lens, Emax represents the maximum exposure parameter of the adjacent lens of the first lens, Emin represents the minimum exposure parameter of the adjacent lens of the first lens, Td is the preset first control threshold, Tu is the preset second control threshold, Rd is the first ratio, Ru is the second ratio, and Fe is the control coefficient.

12. The electronic device of claim 11, wherein the step of calculating second exposure parameters corresponding to each lens according to the exposure control parameters of each lens and the first exposure parameters corresponding to each lens, a calculation formula of the second exposure parameter is: $Ep=Ep0*Ec0t$;

where Ep represents the second exposure parameter.

13. The electronic device of claim 8, wherein the step of acquiring first exposure parameters corresponding to each lens, further comprises:

acquiring ambient brightness corresponding to each lens module; and obtaining the first exposure parameters corresponding to each lens based on the ambient brightness corresponding to each lens module.

14. A non-transitory computer-readable storage medium having computer programs stored thereon, wherein when the computer programs are executed by a processor, cause the processor to perform a method for determining semi-synchronous exposure parameters, comprising steps of:

acquiring first exposure parameters corresponding to each lens;

if it is determined that a preset EV (Exposure Value) limit value is not satisfied according to the first exposure parameters of each lens and adjacent lenses, respectively calculating exposure control parameters of each lens;

calculating second exposure parameters corresponding to each lens according to the exposure control parameters of each lens and the first exposure parameters corresponding to each lens; and if it is determined that the preset EV limit value is satisfied according to the second exposure parameters of each lens and adjacent lenses, determining the second exposure parameters corresponding to each lens to be semi-synchronized exposure parameters of each lens;

wherein the step of respectively calculating exposure control parameters of each lens, comprises:

obtaining the exposure control parameter of a first lens according to a pre-acquired control coefficient, a first ratio and a second ratio, and a preset first control threshold and second control threshold, wherein the first ratio is a ratio of a target exposure parameter corresponding to the first lens to a maximum exposure parameter of the adjacent lens, and the second ratio is a ratio of the target exposure parameter corresponding to the first lens to a minimum exposure parameter of the adjacent lens.

15. The storage medium of claim 14, wherein the step of calculating second exposure parameters corresponding to each lens according to the exposure control parameters of each lens and the first exposure parameters corresponding to each lens, comprises:

calculating a second exposure parameter corresponding to a first lens according to the product of the exposure control parameter of the first lens and the first exposure parameter corresponding to the first lens;

the control coefficient is obtained by multiplying the exposure control parameters of the first lens in different calculation cycles and then extracting a square root.

16. The storage medium of claim 15, wherein the target exposure parameter is a product of the first exposure parameter corresponding to the first lens and the exposure control parameter calculated in a previous calculation cycle of the first lens, and the calculation formula of the target exposure parameter is: Es=Ep0*Ec0t−1;

where Es represents the target exposure parameter corresponding to the first lens, Ep0 represents the first exposure parameter corresponding to the first lens, and Ec0t−1 represents the exposure control parameter calculated in the previous calculation cycle of the first lens.

17. The storage medium of claim 16, wherein calculate the exposure control parameters of each lens according to the following formula:

$$Ec0_t = \begin{cases} \sqrt{\left(\frac{Emax}{Emin}\right)} \div Ru \div Fe & Ru > Tu, Rd < Td \\ Td \div Rd \div Fe & Ru < Tu, Rd < Td \\ Tu \div Ru \div Fe & Ru > Tu, Rd > Td \\ 1 \div Fe & Ru < Tu, Rd > Td \end{cases}$$

where Ec0t represents the exposure control parameter of each lens, Emax represents the maximum exposure parameter of the adjacent lens of the first lens, Emin represents the minimum exposure parameter of the adjacent lens of the first lens, Td is the preset first control threshold, Tu is the preset second control threshold, Rd is the first ratio, Ru is the second ratio, and Fe is the control coefficient.

18. The storage medium of claim 17, wherein the step of calculating second exposure parameters corresponding to each lens according to the exposure control parameters of each lens and the first exposure parameters corresponding to each lens, a calculation formula of the second exposure parameter is: Ep=Ep0*Ec0t;

where Ep represents the second exposure parameter.

19. The storage medium of claim 14, wherein the step of acquiring first exposure parameters corresponding to each lens, further comprises:

acquiring ambient brightness corresponding to each lens module; and obtaining the first exposure parameters corresponding to each lens based on the ambient brightness corresponding to each lens module.

* * * * *